E. C. EMERY.
METHOD OF TREATING FOOD REMNANTS.
APPLICATION FILED APR. 26, 1917.
1,276,888.
Patented Aug. 27, 1918.
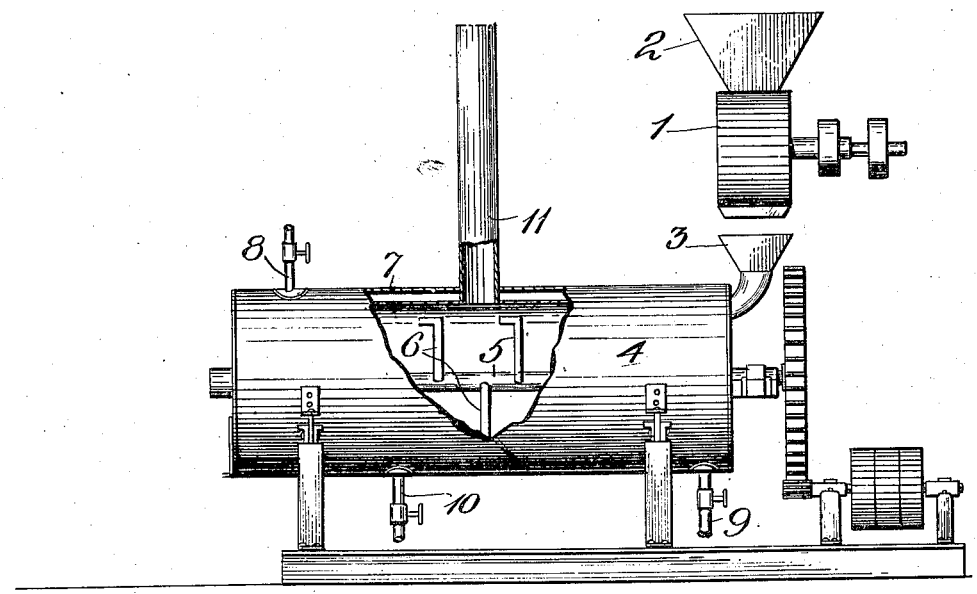
Witnesses:
J. H. Cushing
Inventor:
Edward C. Emery

UNITED STATES PATENT OFFICE.

EDWARD C. EMERY, OF LOS ANGELES, CALIFORNIA.

METHOD OF TREATING FOOD REMNANTS.

1,276,888.

Specification of Letters Patent.  Patented Aug. 27, 1918.

Application filed April 26, 1917. Serial No. 164,621.

*To all whom it may concern:*

Be it known that I, EDWARD C. EMERY, a citizen of the United States, residing at Los Angeles, county of Los Angeles, and State of California, have invented a certain new and useful Method of Treating Food Remnants, of which the following is a specification.

This invention relates to a process for preparing food products, and has especial reference to a process for converting pure and untainted kitchen and table remnants into a condensed palatable food stuff possessing all of the ingredients necessary for nutrition and effectually preserved against micro-organic attack.

My invention contemplates an advance over that method for treating food wastes described and claimed in United States Patent #1,141,622, issued to me June 1, 1915, and wherein it is set out that a mass of foodstuff is subjected to the action of steam under pressure, then ground and finally toasted to drive off excess moisture.

In the extensive practice of the stated invention I have discovered that the subjection to steam of a mass of food pulp extracts a large portion of the mineral and vegetable salts which, becoming coated with films of the melted greases and fats, do not again enter into natural association with the original, and hence, to a certain extent, are vaporized or otherwise driven off when the mass is heated or toasted.

Furthermore the excess moisture added by condensation of the steam makes necessary its removal in order to obtain a dry product, and in the course of such removal a noticeable percentage of valuable food salts are entrained and lost.

One of the objects of this invention, therefore, is to provide a process of converting waste or other food products into a homogeneous food, wherein the juices or moist or wet contents themselves perform the sterilizing action upon the food mass and simultaneously infuse the pulp with the mineral and vegetable salts and the flavors characteristic of the natural ingredients.

A further object of my invention is to provide a process for treating original and waste foods wherein in the course of conversion thereof into a composite yield the same may be oxygenized and concurrently desiccated, thus giving life and adding to the palatability of the compound.

My invention consists generally in sterilizing a ground mass of foodstuffs with heat, and more especially it consists in grinding the foodstuffs, thereby extracting the major portion of juices from vegetables, meat and bone contents, subjecting the mass to dry heat to sterilize same by the ensuing conversion of the liquid portion of the mass into vapor, and aerating and drying the resultant product.

In the accompanying drawing, representing an elevation, I have shown one form of apparatus that may be used for practising this invention.

Therein 1 designates a grinder of any approved construction, having a hopper 2 into which the foods to be treated are deposited. The ground mass or product discharged into a hopper 3, which carries the same into a drier 4, wherein is revolubly journaled a shaft 5, having thereon a plurality of agitating fingers 6. This drier 4 is externally heated, as by steam introduced in a surrounding jacket 7, through a pipe 8, and escaping therefrom through a pipe 9. During the process of drying and agitation the mass may be aerated by introducing preferably heated air through pipe 10. The vapors and gases resulting are carried off through pipe 11 on the top of the drier.

The reduction of the combination of animal and vegetable foodstuff, is accompanied by an expression of the juices or liquid content carrying large portions of the essential salts.

The crushed and ground mass is thereupon subjected to heat applied to the outside of the drier, and to the sterilizing action of steam into which the juices or other liquid content is converted. The converted vapors are exhausted or allowed to escape through a pipe 11, leaving the valuable mineral salts in the mass. These vapors may be condensed to recover any values that may be entrained with them.

Since the quantity of liquid content expressed is not very great, there is no excess moisture to be eliminated, hence the drying of the product may proceed rapidly and without unnecessarily prolonging the exposure to any destructive heat action. Such drying may be accelerated through the mass during agitation and drying of heated air which sweetens the product and gathers and carries off a large proportion of the moisture that is set free during the treatment.

What I claim, is:—

The method of converting food remnants into a condensed food which consists in grinding the remnants to a desired fineness to extract the juice content and reduce the remnants to a pulp, then subjecting the ground mass to a temperature sufficient to convert the juice content into a sterilizing vapor whereby the animal and vegetable salts are infused in the mass, aerating the mass and thereby driving off the excess moisture, and finally drying the mass.

In testimony whereof I affix my signature in the presence of two witnesses.

EDWARD C. EMERY.

Witnesses:
W. H. DUTTON,
ANTON GLOETZNER, Jr.